Patented Oct. 19, 1943

2,332,236

UNITED STATES PATENT OFFICE 2,332,236

OPAQUING AGENT FOR VITREOUS ENAMELS

Harry C. Kremers, Cleveland Heights, and Lester A. Bateman, East Cleveland, Ohio, assignors to The Harshaw Chemical Company, Elyria, Ohio, a corporation of Ohio No Drawing. Application August 20, 1940, Serial No. 353,400

2 Claims. (Cl. 106—312)

This invention relates to ceric oxide opacifiers and has for its objects to provide ceric oxide compositions of high opacifying value and a novel and superior process for producing the same.

According to the literature, ceric oxide ($CeO_2$) exists in a yellow and a white form, both of which are said to have been determined by X-ray examination to be in the cubic system. It has been suggested also that the yellow modification is not actually ceric oxide at all but consists of or contains cerous cerate ($Ce_2O_3 \cdot 3CeO_2$). The oxygen content of $Ce_2O_3 \cdot 3CeO_2$ differs from that of $5CeO_2$ by only about 1.5% so that it is difficult to establish the composition with certainty. In any event, it is known that the yellow modification is not suitable for use as an opaquing agent for vitreous enamels whereas the white form is very excellent for that purpose.

Calcination of cerous compounds, e. g., the hydrate, nitrate or oxalate yield the yellow ceric oxide while calcination of ceric compounds, e. g., the hydrate, nitrate or sulfate, yield the white ceric oxide. However, the white material varies considerably in opaquing value according to the method of production.

We have now discovered that a ceric oxide of superior opaquing value, as compared to the product of straight calcination of ceric compounds, can be produced if the ceric compound is treated as follows:

(1) Mixed with alkali in the presence of water,
(2) The mixture heated beyond the point at which the water has been boiled off,
(3) The calcined mass is quenched in aqueous quenching medium.

Usually the insoluble hydrated ceric oxide will be removed from the quench water washed and dried (or fired for removal of any water of hydration), but these are obvious steps and may not always be followed. The three numbered steps are the significant steps and characterize the process. Cerous compounds also may be employed but in that case they must be calcined under oxidizing conditions. Ceric compounds do not require oxidizing conditions but we prefer to calcine in an oxidizing atmosphere in either case. Among the cerium compounds which we may use as starting materials are ceric and cerous oxides, ceric and cerous hydroxides or hydrates or hydrated oxides, ceric basic nitrate or hydroxy nitrate, cerous carbonate, cerous nitrate, cerous oxalate, cerous and ceric phosphates and cerous and ceric sulfates.

By "alkali" we mean one or more substances of the class consisting of alkali metal and alkaline earth metal oxides, hydroxides, carbonates and nitrates.

The low limit of the extent of calcination is placed at the point at which the water has been boiled off because at that point the reaction has proceeded to an extent to result in the production of a valuable product although in practice we prefer to calcine to an extent to complete or almost complete the reaction. Specifically, we prefer to calcine the mixture from which the water has been boiled off to from 700° C. to 900° C. We consider the optimum temperature to be about 750° C. to 850° C. The time required to bring the batch to a temperature of 700° C. to 900° C. range will meet the time requirements but we prefer a firing cycle involving holding the temperature at the selected maximum or at least within the 700° C. to 900° C. range for from ½ to 1½ hours. Raising the temperature above 900° C. does not seem to harm the product but appears not to improve it. We prefer to raise the temperature to 750° C. to 850° C. as rapidly as convenient without using a kiln temperature higher than the desired batch temperature and holding the batch in that temperature range for ½ hour to 1½ hours, desirably about one hour. Normally, the batch will be held at maximum temperature for a longer time if that temperature is low and for a shorter time if that temperature is high. The desirable thing is that the reaction be brought to completion.

Normally the calcined mass will be quenched in water but it may be desirable in some cases to employ an acid solution as a quenching medium. For example, if the alkali employed is lime, an acid quenching medium may be the best mode of separating ceric oxide from calcium oxide.

The optimum proportions of alkali and cerium compound are the stoichiometric proportions theoretically required to produce an alkali cerate, e. g. two mols NaOH per atom of cerium or one mol $Ba(OH)_2$ per atom of cerium. We believe that such compounds as $Na_2O \cdot CeO_2$ and $CaO \cdot CeO_2$ are produced and that they decompose in water leaving $CeO_2$ in highly desirable physical state for use as an opacifier in vitreous enamels. The alkali should not greatly exceed the optimum proportion on account of the energetic action which occurs on quenching. However, an excess of 10% or 15% can be tolerated. The alkali should, on the other hand, not be greatly under the theoretical proportions, since, in that case, the result will be an admixture of improved and unimproved material. Ceric oxide is noticeably improved by 25% of the theoretical quantity of alkali and considerably improved by 50% thereof. However, we recommend the use of at least 75% of the theoretical quantity and, of course, prefer to use the stoichiometric ratio. We believe, accordingly, that the essence of our invention resides in the production of an opaquing agent which is ceric oxide in the form of an alkali (alkali metal or alkaline earth metal) create hydrolysis product. However, we do not wish to rest our invention entirely upon theoretical grounds and, accordingly, we describe and claim the process we employ and the product thereof.

A further feature of our invention is the discovery that where the cerium starting material is an oxide or hydrate, the presence of a small amount of phosphate ion therein improves the final product. The quantity of phosphate ion by weight should desirably be from 0.2% to 0.8% and preferably 0.4% to 0.6% based on $CeO_2$. The phosphate ion is desirably in the form of cerium phosphate.

In all cases, we prefer to use ceric oxide or ceric hydrate (desirably with 0.4% to 0.6% of phosphate ion based on $CeO_2$) as the starting material, to mix therewith sodium hydroxide or sodium carbonate in theoretical proportions (plus or minus 10 or 15 mol per cent) to make a sodium cerate and with water to make a thick slurry, to boil off the water and heat further to from 750° C. to 850° C. for from ½ hour to 1½ hours, to quench in water, wash the resulting cerium compound and dry or, optionally, again heat to 700° C. to 900° C. to remove any physically or chemically bound water.

Small quantities of impurities can be tolerated although pure materials are desirable. Of the impurities likely to be present, iron and manganese especially should be kept low, desirably below 0.05% although 0.1% can be tolerated.

The following specific examples will serve to illustrate the invention:

Example I

Approximately 80 parts by weight of NaOH and 172 parts by weight of $CeO_2$ (white form) in sufficient water to make a thick slurry were mixed thoroughly and heated until the temperature of the mass was 800° C. and held at that temperature for one hour. The mass was then quenched in water whereupon substantially complete decomposition to NaOH and ceric oxide (probably hydrated) occurred. The NaOH was washed out and the ceric oxide or hydrate was heated to 700° C. and held at that temperature for one hour. The resulting ceric oxide was found to have excellent opacifying properties, markedly superior to the ceric oxide starting material.

Example II

Example I was repeated using a ceric oxide derived from ceric phosphate and containing ½ per cent by weight of phosphate ion. The resulting product was somewhat superior to the products of Example I. The presence of phosphate ion may be expected to increase the reflectance under favorable conditions one or two per cent. The caustic fusion treatment may be expected to increase the reflectance up to 6 or 7 per cent under favorable conditions.

Example III

Example I was repeated using ceric oxide of the yellow type. The results were equally good. That is, the final product was equal to the final product produced according to Example I.

Example IV

Cerous oxalate was made into a water slurry with the quantity of $NaNO_3$ theoretically required to produce $Na_2CeO_3$, ignited, the product washed free from sodium and the ceric compound calcined at 700° C. for one hour. The resulting $CeO_2$ was comparable to the product resulting from Example I.

Having thus described our invention, what we claim is:

1. A process of producing a ceric oxide of superior opaquing properties in vitreous enamels comprising calcining a cerium oxide, NaOH and a phosphate, the cerium oxide and NaOH being in proportion to form $Na_2O \cdot CeO_2$ plus or minus 15 mol per cent and the phosphate radical being present to the extent required to yield phosphate radical to the extent of from 0.2% to 0.8% of the $CeO_2$ in the final product, the temperature of calcination being from 700° C. to 900° C. and the time from ½ hour to 1½ hours, and decomposing the calcination product by the action of water.

2. A process of producing ceric oxide in a form suitable for use as an opaquing agent for vitreous enamels including the steps of mixing in aqueous medium a cerium compound of the class consisting of ceric and cerous oxides, ceric and cerous hydroxides, hydrates and hydrated oxides, basic ceric nitrate, cerous carbonate, cerous nitrate, cerous oxalate, cerous and ceric phosphates, and cerous and ceric sulfates, a small amount of phosphate material being included, and an alkaline material of the class consisting of alkali metal and alkaline earth metal oxides, hydroxides, carbonates and nitrates, calcining the resulting batch at a temperature from 700° C. to 900° C. and then introducing the resulting material into aqueous medium and removing from the resulting aqueous mixture a pigment grade ceric oxide.

HARRY C. KREMERS.
LESTER A. BATEMAN.